United States Patent [19]

Pla et al.

[11] Patent Number: 5,221,185

[45] Date of Patent: Jun. 22, 1993

[54] METHOD AND APPARATUS FOR SYNCHRONIZING ROTATING MACHINERY TO REDUCE NOISE

[75] Inventors: Frederic G. Pla, Schenectady; George C. Goodman, Albany, both of N.Y.

[73] Assignee: General Electric Company, Schenectady, N.Y.

[21] Appl. No.: 740,221

[22] Filed: Aug. 5, 1991

[51] Int. Cl.$^5$ ............................................. B64D 31/12
[52] U.S. Cl. ..................... 416/34; 244/1 N; 381/71; 364/574
[58] Field of Search ................. 244/1 N, 118.5, 129.1; 381/71; 181/206; 416/33, 34, 500; 364/574, 508, 474.22, 431.01, 494; 415/119; 60/39.21, 281

[56] References Cited

U.S. PATENT DOCUMENTS

| | | | |
|---|---|---|---|
| 3,071,752 | 1/1963 | Strasberg | 181/206 |
| 3,689,175 | 9/1972 | Hartzell | 416/34 |
| 4,025,724 | 5/1977 | Davidson, Jr. et al. | 364/574 |
| 4,488,240 | 12/1984 | Kapadia et al. | 364/508 |
| 4,947,356 | 8/1990 | Elliott et al. | 244/1 N |
| 4,953,098 | 8/1990 | Fischer, Jr. et al. | 364/508 |

*Primary Examiner*—Galen Barefoot
*Attorney, Agent, or Firm*—Patrick R. Scanlon; Paul R. Webb, II

[57] ABSTRACT

A system for reducing noise created by multiple rotating machines by synchronizing the machines so as to establish a phase relationship between the machines which minimizes the noise. One or more feedback sensors, such as microphones, are placed so as to sense the noise to be reduced. The noise signals from the microphones are sent to a controller. Tachometer signals of the rotational speed of each machine are also sent to the controller. The controller generates an output signal in response to the inputs from the microphones and the tachometers that is fed to one or more of the rotating machines in order to establish the desired phase relationships.

11 Claims, 5 Drawing Sheets

METHOD AND APPARATUS FOR SYNCHRONIZING ROTATING MACHINERY TO REDUCE NOISE

CROSS REFERENCES TO RELATED APPLICATIONS

This application is related to copending application entitled "Accelerometer-Driven Active Synchrophasing for Vibration Reduction", Ser. No. 07/705,987, filed May 28, 1991 and assigned to the same assignee as the present invention.

BACKGROUND OF THE INVENTION

This invention relates generally to reducing noise generated when two or more rotating machines are operated and more particularly concerns a method and apparatus for synchronizing the machines by continuously adjusting the speed of one or more of the machines to create a phase relationship between the machines which minimizes noise.

Noises generated when two or more nominally identical rotating machines are running can cause a variety of engineering problems. Perhaps the most common sources of noise problems are propellers, unducted fans (UDF) and turbofans in multi-engine aircraft, although other multiple rotating machinery can create equally troublesome problems. Propeller or turbine noise generated by two-engine or four-engine aircraft results in large noise levels inside the passenger compartment. The major part of this noise is due to propeller or turbine airborne noise radiation transmitted through the fuselage of the aircraft. Small differences in the rotational speed or RPM between each of the engines result in sound waves from each propeller or turbine having different frequencies. The sound waves of different frequencies generate a sound pressure level inside the cabin which is slowly varying with time. This slowly varying sound pressure level is referred to as acoustic beats. Acoustic beats, which are experienced by passengers in virtually all propeller commuter aircraft and in some turbofan aircraft, are annoying and responsible for a high perceived cabin noise level. A similar situation occurs when noise from several rotating machines interferes. Improper phasing results in large perceived sound levels and time varying phasing results in acoustic beats. This problem is common with multiple fan systems used for cooling electrical or electronic equipment.

Most present turboprop engine synchrophasers are only designed to ensure that the speeds of all engines are reasonably close. As a result, engines drift in and out of phase with time. This causes time varying acoustic levels. With more advanced FADEC engines, an attempt is sometimes made to phase-lock the engines which has the effect of preventing acoustic beats. However, these systems do not attempt to minimize noise by feeding back cabin noise levels to the engine speed controller.

SUMMARY OF THE INVENTION

Accordingly, it is an object of the present invention to minimize the noise level produced by multiple sources, each having a fundamental frequency directly related to its speed of operation, by setting up acoustic destructive interferences between the sources.

More specifically, it is an object of the present invention to provide a method and apparatus that continuously adjust the speed of one or more of the noise sources to establish a phase relationship between the noise sources that minimizes noise levels.

In addition, it is an object of the present invention to provide a method and apparatus which utilize a feedback signal from noise transducers placed in the location where noise is to be minimized.

These and other objects are accomplished in the present invention by providing an active synchrophaser in a structure with multiple noise sources. The system comprises one or more noise transducers, such as microphones, that sense the noise level and generate a signal corresponding to the noise level and a plurality of tachometers which provide signals corresponding to the rotational speed of each noise source. The noise and speed signals are fed to a controller which determines a control signal to establish a phase relationship between the noise sources that minimizes noise generated by the noise sources. The system further comprises a pulse generator which produces a pulse each time a master one of the noise sources passes through a predetermined angle of rotation. The pulse generator triggers a sample and hold circuit which captures an instantaneous signal of the noise level from the microphones and outputs the instantaneous noise signal to the controller.

Other objects and advantages of the present invention will become apparent upon reading the following detailed description and the appended claims and upon reference to the accompanying drawings.

DESCRIPTION OF THE DRAWINGS

The subject matter which is regarded as the invention is particularly pointed out and distinctly claimed in the concluding portion of the specification. The invention, however, may be best understood by reference to the following description taken in conjunction with the accompanying drawing figures in which:

DETAILED DESCRIPTION OF THE INVENTION

Figure 1:
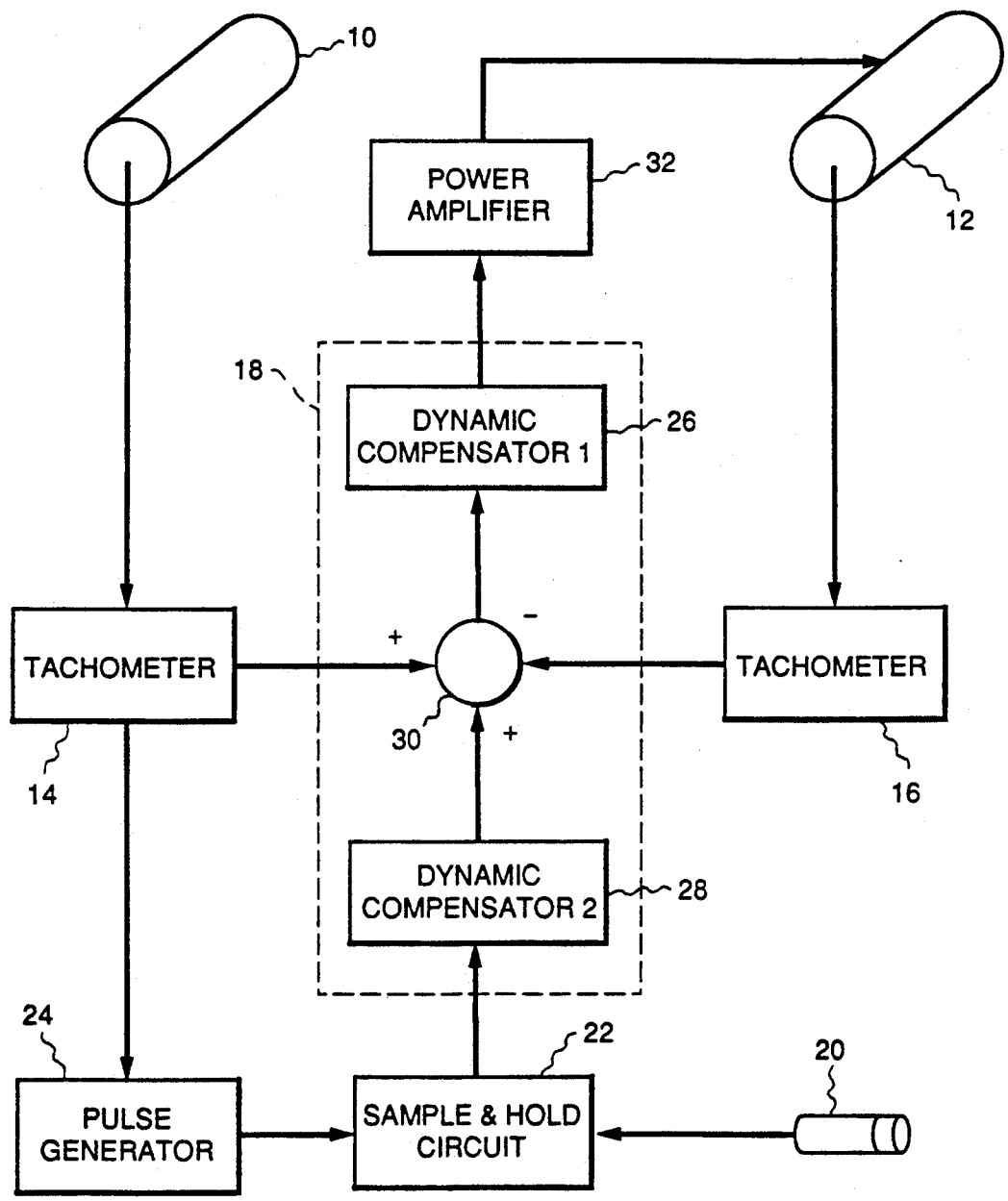
FIG. 1 is a block diagram representing the system of the present invention.

Referring to FIG. 1, the basic system of the present invention is described. The system shown in FIG. 1 is limited to two noise sources to simplify the discussion, but the present invention is applicable to systems having more than two sources. In FIG. 1, the sources of noise are represented by two motors or engines 10 and 12. For example, these two engines could be the right and left turboprop engines of a two engine aircraft. The first engine 10 is referred to as the master engine because it is operated at whatever speed is dictated by the requirements of the particular application of the motors. The second engine 12 is referred to as the slave engine because its speed is continually adjusted by the system so that the resulting phase difference between the shaft angles of the two motors yields the least noise. In the instance where more than two engines are involved, one engine would be the master and the rest would be slaves.

The system of the present invention reduces noise by closing two feedback loops around each slave engine: a shaft speed control loop and a shaft angle control loop. In FIG. 1, the shaft speed control loop utilizes two tachometers 14 and 16. The tachometers 14,16 are attached to the respective shafts of the two engines 10,12 for monitoring the shaft speeds. Shaft speed signals from the tachometers 14,16 are inputted to a controller 18. The controller 18 determines a shaft speed error signal by subtracting the shaft speed signal of the slave engine tachometer 16 from the shaft speed signal of the master engine tachometer 14. The shaft speed difference can be obtained by using either an analog circuit in which the shaft speed signals are passed through frequency-to-voltage converters and a differential amplifier or counters and a digital processor. The controller 20 maintains the shaft speed error signal near zero, and thus operates the two engines 10,12 at the same nominal speed, by utilizing an appropriate dynamic compensation algorithm. A signal from the controller 18 is fed back to the slave engine 12 to close the shaft speed control loop.

The shaft angle control loop requires an input of the noise level which is to be reduced. The present invention accomplishes this by providing one or more feedback sensors. The feedback sensors are typically microphones, although other transducers such as accelerometers or a combination of microphones and other transducers can be used. The feedback sensors are situated so as to sense the noise level which is to be reduced. When reducing noise in an aircraft, the feedback sensors are placed at strategic locations in the cabin of the aircraft. These locations depend on the specific aircraft configuration and can be chosen to minimize noise globally in the cabin or in particular problem areas. In FIG. 1, the feedback sensors are represented by a microphone 20. Although only a single microphone 20 is shown, it is contemplated that most applications will use a plurality of sensors.

The microphone 20 produces a signal representing the sensed noise level. This signal is inputted to a common sample and hold circuit 22. A pulse generator 24 is connected to the shaft of the master engine 10 to generate a pulse every time the shaft passes through a reference angle. The pulse is inputted to the sample and hold circuit 22 to trigger the circuit to capture an instantaneous value of the noise level signal. This instantaneous value, or error signal, is fed to the controller 18. Using a second dynamic compensation algorithm, the controller 18 drives the error signal as close to zero as possible, thereby minimizing the noise level. In addition to completing the shaft speed control loop, the feedback from the controller 18 to the slave engine 12 completes the shaft angle control loop to maintain a phase relationship between the engine shafts which minimizes the noise created by the engines.

Preferably, the controller 18 comprises a first dynamic compensator 26, a second dynamic compensator 28, and a summer 30. The second dynamic compensator 28 may be a proportional plus integral control which receives the error signal from the sample and hold circuit 22 and produces an output proportional to the linear combination of the error signal and the time integral of the error signal. This output represents a dynamic "set point" of what the speed difference between the two engines 10,12 should be. Ultimately, the difference in shaft speed of the two engines is zero, but because the speed of the slave engine 12 is constantly being adjusted to maintain the proper phase relationship, the set point varies. The set point signal is fed to the summer 30 where it is compared with the actual difference between the shaft speed signal of the master engine tachometer 14 and the shaft speed signal of the slave engine tachometer 16. Thus, the output of the summer 30, which is essentially the sum of the set point and the actual speed difference, is fed to the first dynamic compensator 26. The first dynamic compensator 26 is an integrator that produces the controller output which is fed to the slave engine 12. This controller output is first amplified by a power amplifier 32.

In operation, the controller output is sent to an actuator which produces the small changes in the speed of the slave engine necessary for the system to operate. The actuator is connected to the engine control system which incorporates the fuel control system and the propeller governor. Small propeller speed changes occur through small changes in engine fuel flow and in propeller blade angle of attack. For safety reasons, the system is limited to a narrow speed range and can be overridden by the pilot at any time. To minimize backlash problems, the actuator can be connected to the engine itself through a modified linkage assembly. A limited-travel linear actuator incorporating a servomotor with position feedback is built in a linkage rod connecting the engine control unit to the engine nacelle. Once the pilot locks the power or speed control lever in place, small changes in the actuator length result in small changes in speed.

The theory behind the present noise reduction system is most easily described referring to the two engine system of FIG. 1. If both engines produce sinusoidal sound fields having unit pressure amplitude, the total sound pressure, y(t), is given by $$y(t) = \cos\omega_m t + \cos(\omega_s t + \phi_s(t)) \quad (1)$$

where $\omega_m$ is the rotational speed of the master engine 10, $\omega_s$ is the rotational speed of the slave engine 12, t is time, and $\phi_s(t)$ is the phase angle of the slave relative to the master. The pulse generator 24 generates a pulse every time the shaft of the master engine passes through the particular angle $\theta$. The pulse triggers the sample and hold circuit to capture an instantaneous value of y(t). The time, T, at which a sample is acquired is given by $$T = \frac{2\pi n + \theta}{\omega_m}, \quad n = 0, 1, 2, \ldots \quad (2)$$

where n is the sample number. Substituting Equation (2) into Equation (1) yields the sampled sound pressure, $$y(T) = \cos(2\pi n + \theta) + \cos\left((2\pi n + \theta)\frac{\omega_s}{\omega_m} + \phi_s(T)\right). \quad (3)$$

Now applying the two tachometers 14,16 to close the shaft speed control loop and thus causing the speed of the slave engine to track the speed of the master engine provides $\omega_m \approx \omega_s$. Thus, $$y(T) \approx \cos(2\pi n + \theta) + \cos(2\pi n + \theta + \phi_s(T)) = \cos\theta + \cos(\theta + \phi_s(T)). \quad (4)$$

Next, closing the shaft angle control loop to drive y(T) to zero yields $$\cos\theta = -\cos(\theta + \phi_s(T)) = \cos(\theta + \phi_s(T) + k\pi), \text{ k=any odd integer.} \quad (5)$$

The two solutions to Equation (5) are
$$\theta = \pm(\theta + \phi_s(T) + k\pi) \quad (6)$$

so that $$\phi_s(T) = -k\pi \quad (7)$$

or $$\phi_s(T) = -k\pi - 2\theta. \quad (8)$$

Figure 2:
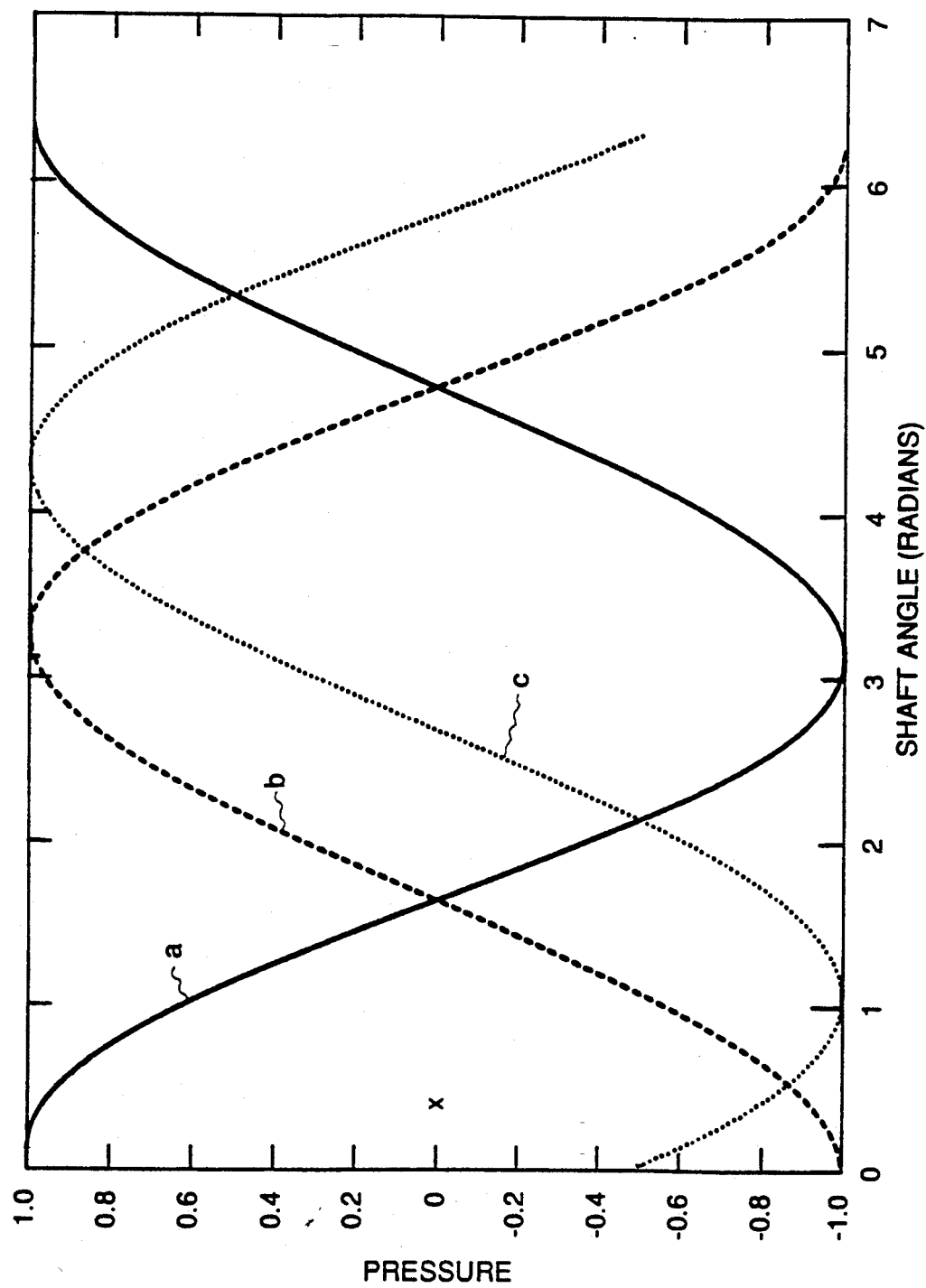
FIG. 2 is a graph plotting sound pressure level versus shaft angle for comparing the noise levels produced by two engines.

FIG. 2 shows the character of these two solutions. The solid line a is the sound pressure due to the master engine. The dashed line b represents the sound pressure created by the slave engine if Equation (7) holds, and the dotted line c represents the sound pressure created by the slave engine if Equation 8 holds. For the purpose of illustration, $\theta$ is chosen to be equal to $\pi/6$ which is marked with an "x" in FIG. 2. Clearly, both solutions show that the sound pressure from the slave engine cancels that from the master engine at $\theta$; however, only the Equation (7) solution actually cancels the noise over full shaft revolution. As seen in the Figure, the Equation (8) solution can increase noise at some shaft angles. The question of which of these solutions will the feedback system of the present invention converge to is answered by considering the small signal behavior of the slave system when linearized about each of these two equilibrium solutions. Taking the first variation of Equation (4) yields $$\delta y(T) = -\sin(\theta + \phi_s(T))\delta\phi_s(T). \quad (9)$$

Substituting Equation (7) into Equation (9) gives $$\delta y(T) = -\sin(\theta + k\pi)\delta\phi_s(T) = \sin(\theta)\delta\phi_s(T); \quad (10)$$

whereas substituting Equation (8) into Equation (9) yields $$\begin{aligned}\delta y(T) &= -\sin(\theta - k\pi - 2\theta)\delta\phi_s(T) \\ &= -\sin(-k\pi - \theta)\delta\phi_s(T) \\ &= -\sin(\theta)\delta\phi_s(T).\end{aligned} \quad (11)$$

Equations (10) and (11) show that the sign of the small signal gain $\delta y(T)/\delta\phi_s(T)$, is opposite for the two equilibrium points. The controller can thus be easily designed to stabilize the system about the desired point, $\phi_s(T) = k\pi$, while rendering the other equilibrium point unstable.

Figure 3:
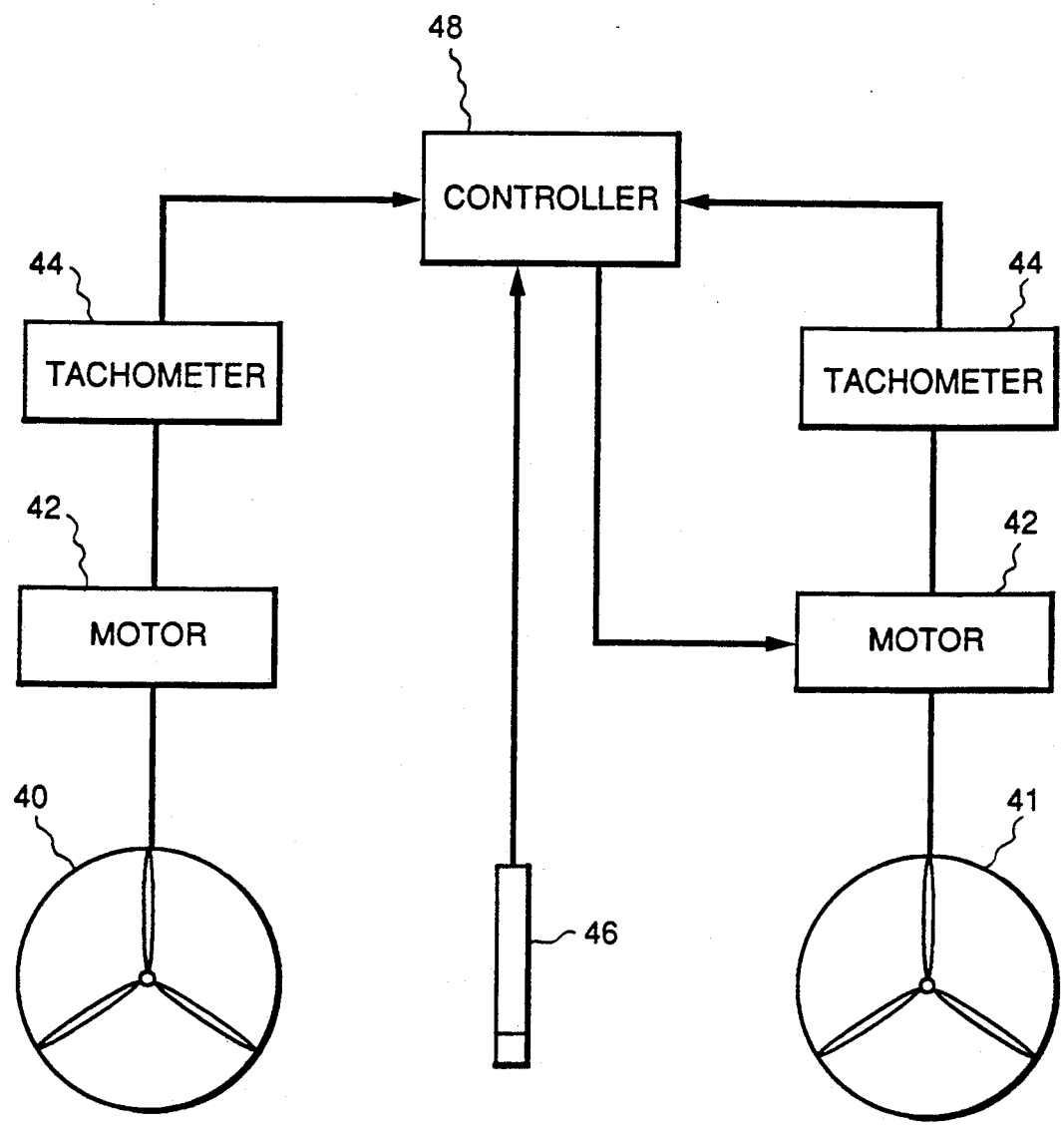
FIG. 3 is a schematic drawing illustrating an experimental setup of the present invention.

In a preliminary experiment, a scaled-down model was designed to show the validity of the present invention. A schematic of the experimental setup is shown in FIG. 3. The noise sources consist of two 12 inch diameter model propellers 40,41 mounted three feet apart and powered by respective DC motors 42. Tachometers 44 are provided to obtain signals of rotational speed for each propeller, and a microphone 46 is mounted between the two propellers to generate a noise signal. All signals are inputted to a controller 48. The DC output from the controller 48 is sent to the slave propeller 41 through a DC amplifier (not shown). The controller is implemented on a digital processor connected to several A/D and D/A channels.

Figure 4:
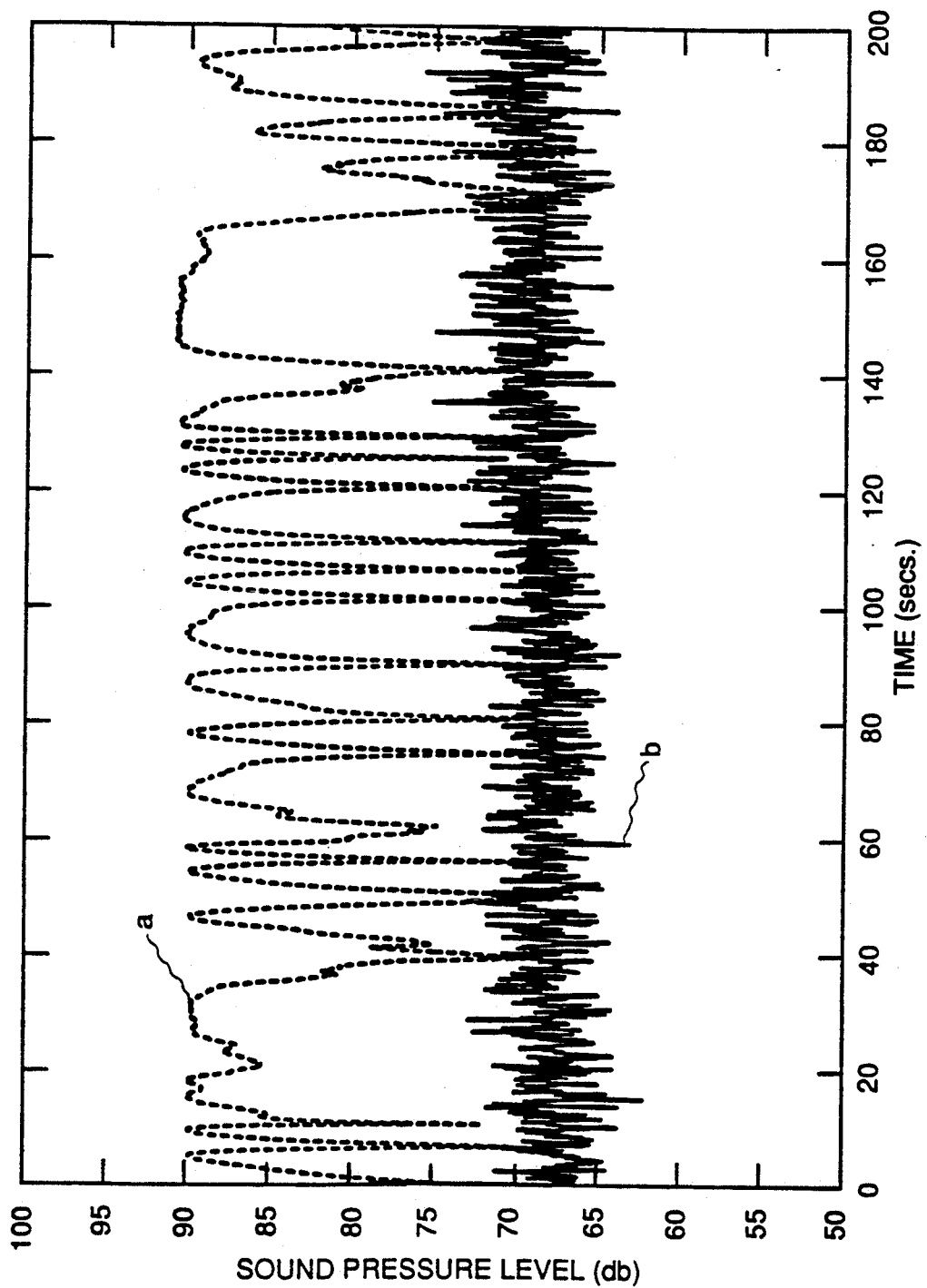
FIG. 4 is a graph plotting a filtered sound pressure level signal versus time for comparing the noise levels produced with the controller on and with the controller off.

FIG. 4 shows the sound pressure level at the microphone 46 versus time with and without the controller 48 operating. The dashed line a shows the sound pressure level with the controller off, and the solid line b shows the sound pressure level with the controller on. The microphone signal is low-pass filtered to eliminate frequency components above the blade passage frequency. With the controller off, the measured difference in sound pressure level between maximum and minimum is as much as 25 dB due to the time varying phase between the propellers 40,41. Since the background noise level and the measured minimum sound pressure level are about the same, it is not possible to determine exactly the true value of the minimum sound pressure level. With the controller 48 on, the "minimum noise" phase relationship between the propellers 40,41 is accurately maintained. The sound pressure level at the microphone 46 is kept to a level corresponding to the minimum level of the beats, and equal to the background noise.

Figure 5:
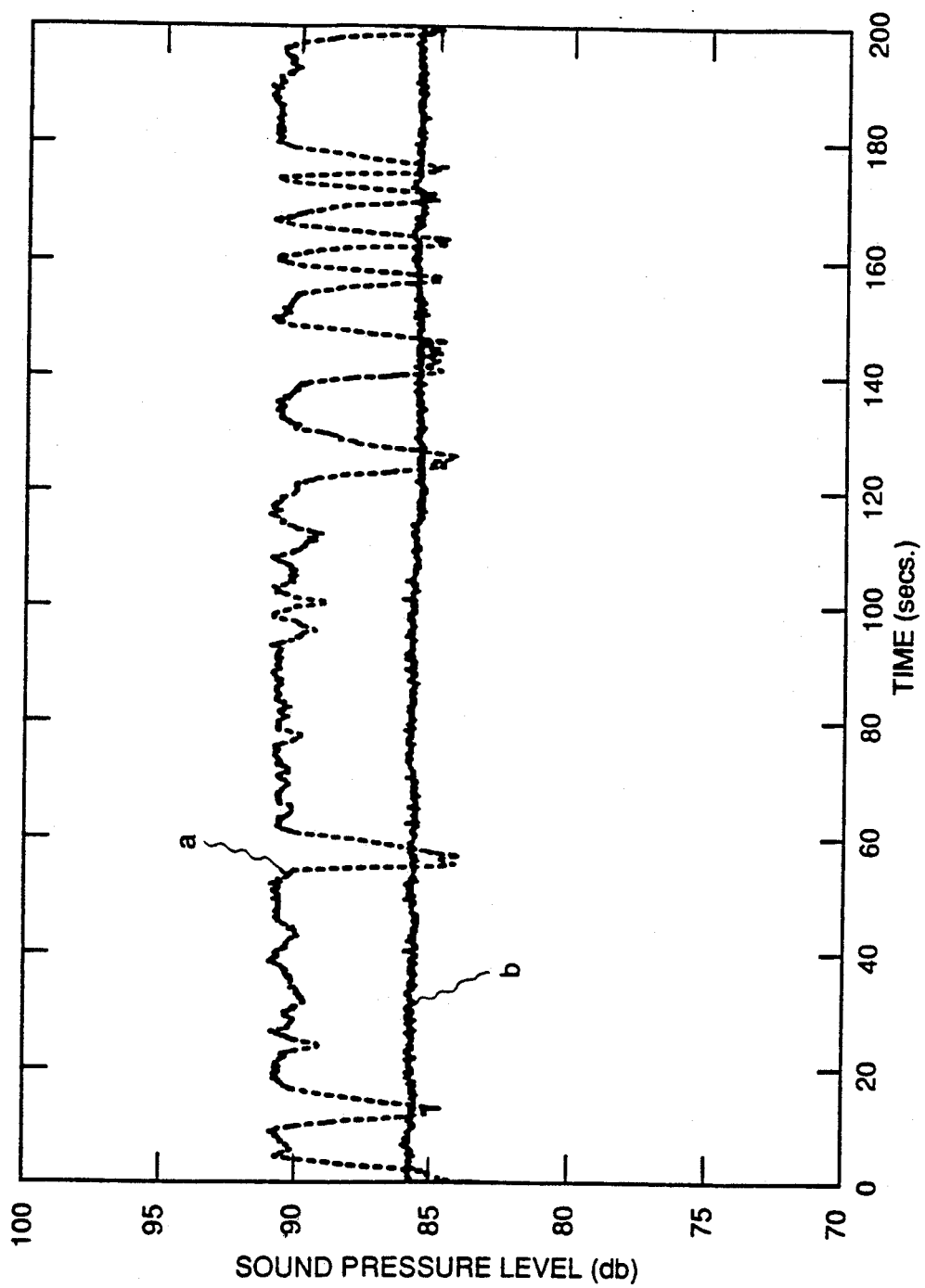
FIG. 5 is a graph plotting a non-filtered sound pressure level signal versus time for comparing the noise levels produced with the controller on and with the controller off.

FIG. 5 shows the total sound pressure level at the microphone 46 with no filtering applied to the microphone signal. Again, the dashed line a represents the noise level with the controller off, and the solid line b represents the noise level with the controller on. Due to the high level of the harmonics of the blade passage frequency, the amplitude of the beats is lower than when the blade passage tone alone is considered. As shown in FIG. 5, when the controller 48 is operating the noise is minimized to within 10% of the minimum beat noise level. Operation of the controller is very stable as evidenced by the very small variations in the sound pressure level with respect to time. The difference between the minimum beat level and the level measured with the controller 48 operating is due to the low-pass filtering of the controller noise input in order to eliminate frequency components above the second harmonic of the blade passage frequency and to reduce noise in the signal.

The foregoing has described a system which minimizes noise produced by multiple rotating machines, particularly aircraft engines, by establishing an appropriate phase relationship between the machines based on input of the noise level to be reduced.

While specific embodiments of the present invention have been described, it will be apparent to those skilled in the art that various modifications thereto can be made without departing from the spirit and scope of the invention as defined in the appended claims.

What is claimed is:

1. An apparatus for minimizing noise in a system having at least two rotating machines comprising:
noise transducer means for sensing the noise level created by the at least two rotating machines and generating a signal corresponding to the noise level;
a plurality of means for sensing rotational speed and generating a signal corresponding to the sensed speed, each one of the at least two rotating machines having a respective one of said speed sensing means sensing the rotational speed thereof; and a controller which receives said signals from said noise transducer means and each of said speed sensing means and accordingly determines a control signal which establishes a phase relationship between the at least two rotating machines that minimizes noise generated by the at least two rotating machines.

2. The apparatus of claim 1 further comprising:
a pulse generator associated with a master one of the at least two rotating machines for outputting a pulse each time said master machine passes through a predetermined angle of rotation; and
a sample and hold circuit connected to said pulse generator and to said noise transducer means, said sample and hold circuit being triggered by said pulse generator to capture an instantaneous signal of the noise level sensed by said noise transducer means when said master machine passes through the predetermined angle of rotation and outputting said instantaneous noise signal to said controller.

3. The apparatus of claim 2 wherein said controller includes a proportional plus integral control which receives said instantaneous noise signal and produces a first signal, a summer which receives said first signal and said signals generated by each of said speed sensing means and produces an output signal which is the sum of said first signal and the difference of said signals generated by each of said speed sensing means, and an integrator which integrates said output signal to produce said control signal.

4. The apparatus of claim 1 wherein said noise transducer means is a microphone.

5. The apparatus of claim 1 wherein said noise transducer means is a plurality of microphones.

6. The apparatus of claim 1 wherein each one of said means for sensing rotational speed is a tachometer.

7. An apparatus for minimizing noise in an aircraft having at least two engines comprising:
a plurality of noise transducers arranged in the cabin of the aircraft which sense the noise level in the cabin and generate a signal corresponding to the noise level;
a tachometer associated with each one of the at least two engines for sensing rotational speed of the respective engine and generating a signal corresponding to the sensed speed;
a pulse generator associated with a master one of the at least two engines for outputting a pulse each time said master engine passes through a predetermined angle of rotation;
a sample and hold circuit connected to said pulse generator and to said noise transducers, said sample and hold circuit being triggered by said pulse generator to capture an instantaneous value of the noise level sensed by said noise transducers when said master engine passes through the predetermined angle of rotation and outputting a first signal corresponding to the instantaneous value; and
a controller which receives said signals from said sample and hold circuit and each of said tachometers and accordingly determines a control signal which establishes a phase relationship between the at least two engines that minimizes noise generated by the at least two engines.

8. The apparatus of claim 7 wherein said controller includes a proportional plus integral control which receives said first signal and produces a second signal, a summer which receives said second signal and each of said tachometer signals and produces an output signal which is the sum of said second signal and the difference of said tachometer signals, and an integrator which integrates said output signal to produce said control signal.

9. A method for minimizing noise in a system having at least two rotating machines, said method comprising the steps of:
producing a noise signal corresponding to the noise created by the at least two rotating machines;
producing speed signals corresponding to the rotational speed of each of the at least two rotating machines;
determining a control signal based on said noise signal and said speed signals which establishes a phase relationship between the at least two rotating machines that minimizes noise; and
outputting said control signal to at least one of the at least two rotating machines thereby establishing the desired phase relationship.

10. The method of claim 9 wherein said step of determining a control signal includes producing a first signal proportional to the linear combination of said noise signal and the time integral of said noise signal and integrating the sum of said first signal and the difference of said speed signals.

11. An apparatus for minimizing noise in a system having at least two rotating machines comprising:
noise transducer means for sensing the noise level created by the at least two rotating machines and generating a signal corresponding to the noise level;
means for sensing the rotational speed of a master one of the at least two rotating machines and generating a signal corresponding to the sensed speed;
a pulse generator associated with said master machine for outputting a pulse each time said master machine passes through a predetermined angle of rotation;
a sample and hold circuit connected to said pulse generator and to said noise transducer means, said sample and hold circuit being triggered by said pulse generator to capture an instantaneous value of the noise level sensed by said noise transducer means when said master machine passes through the predetermined angle of rotation and outputting a signal corresponding to the instantaneous noise value; and
a controller which receives said signals from said sample and hold circuit and said means for sensing the rotational speed of said master machine and accordingly determines a control signal which establishes a phase relationship between the at least two rotating machines that minimizes noise generated by the at least two rotating machines.

* * * * *